J. LEWIS.
EDUCATIONAL TOY.
APPLICATION FILED MAR. 28, 1916.

1,206,867.

Patented Dec. 5, 1916.

Inventor
Jewel Lewis.
By his Attorney
Oscar Geier

UNITED STATES PATENT OFFICE.

JEWEL LEWIS, OF BROOKLYN, NEW YORK.

EDUCATIONAL TOY.

1,206,867.   Specification of Letters Patent.   Patented Dec. 5, 1916.

Application filed March 28, 1916. Serial No. 87,174.

*To all whom it may concern:*

Be it known that I, JEWEL LEWIS, a citizen of the United States, and a resident of Brooklyn, in the county of Kings and State of New York, have invented certain new and useful Improvements in Educational Toys, of which the following is a specification.

This invention relates to improvements in educational toys and particularly to such as are adapted for the purpose of teaching geography, while at the same time affording an innocent and pleasurable amusement.

The principal object of the invention is to provide an inflatable body upon which may be inscribed any desired device, it being particularly appropriate for maps because of the spherical shape which the toy assumes when inflated, taking the place of a far more expensive globe, commonly made use of for the same purpose, thus maps for strategical and other like purposes can be made in a form easy to carry and which can be inflated for inspection as desired.

A second object is to combine with the device a peculiar form of inlet valve whereby the globe may be inflated with unusual ease, as by a continuous succession of air puffs as produced by the mouth of a child; and finally to provide such devices that are inexpensive to construct and which are of relatively lasting quality.

These and other objects are attained by the novel construction and combination of parts hereinafter described and shown in the accompanying drawings, forming a material part of this specification, and in which:—

Figure 1:
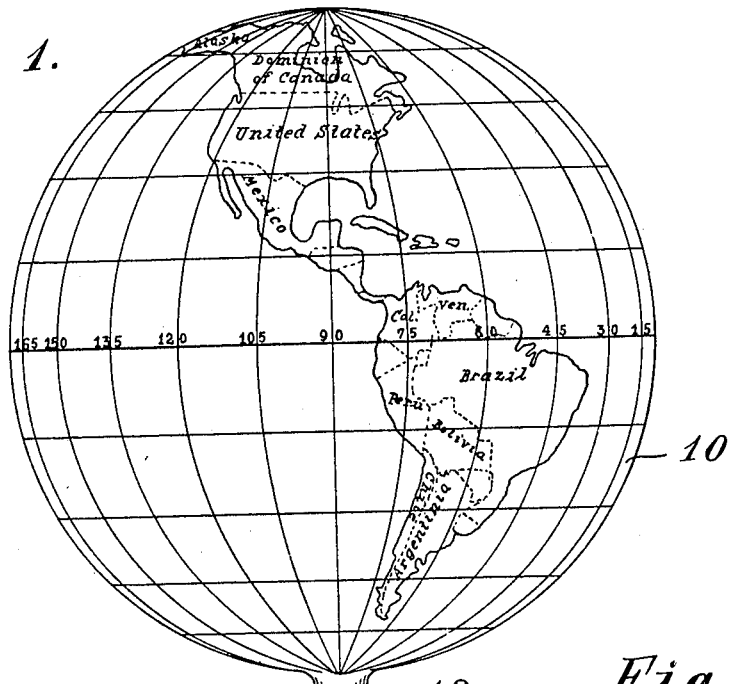
Figure 2:
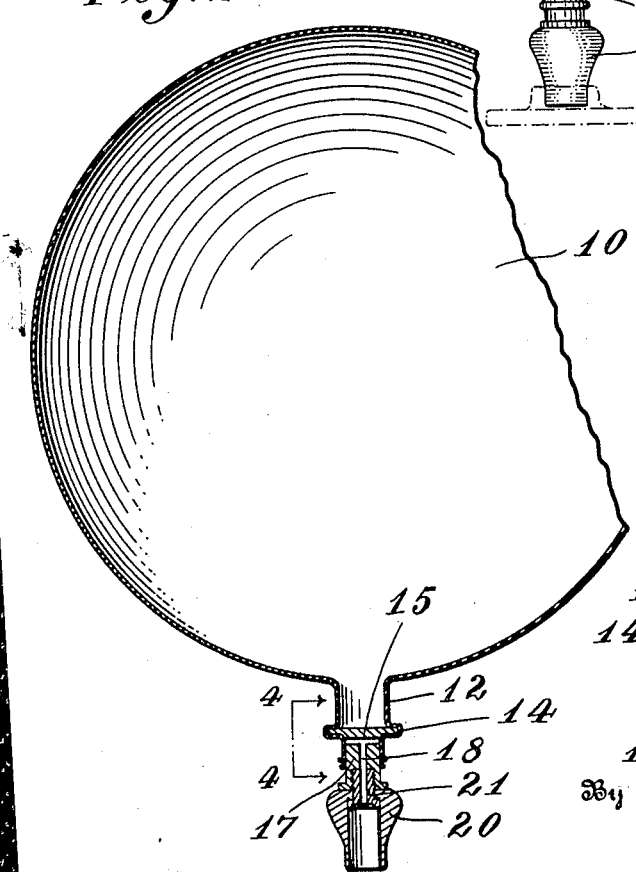
Figure 3:
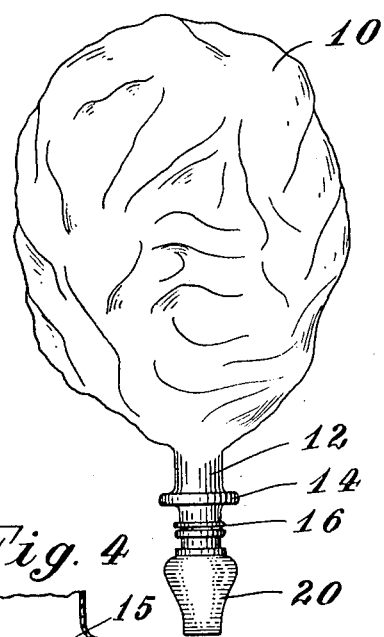
Figure 4:
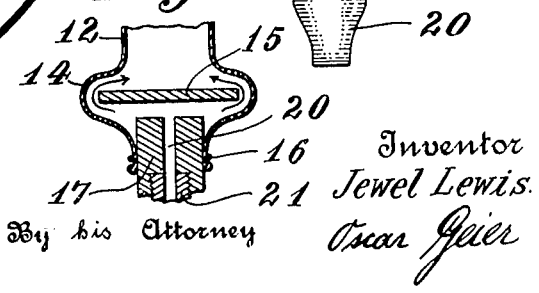

Figure 1 is a front elevation of the toy expanded and showing a map of the Western Hemisphere upon its surface. Fig. 2 is a fractional sectional view taken substantially on the center line of Fig. 1. Fig. 3 shows the device in a partially collapsed or deflated position, and Fig. 4 is a transverse sectional view taken substantially on line 4—4 of Fig. 2, and drawn to an increased scale.

The device is comprised of a flexible, expansible casing 10, impervious to air and of such elasticity that when collapsed it may be folded into a small compass. Upon the surface of the main body portion are exhibited devices of educational nature, as for instance the maps clearly shown in Fig. 1, the same being imprinted in bright colors contrasting with the back ground or body surface which has a bright, glossy finish, and in the case shown, will indicate water. The other side may have upon it the Eastern Hemisphere drawn to the same scale. The article may obviously be used for other like purposes, whereby, in addition to the amusement afforded, it has a high educational value. By its use the location of the principal countries shown on the map of the world may be readily acquired with the same ease as from an ordinary globe.

The casing is provided with a narrow neck 12, formed of the same material and containing at the lower part an enlarged annulus 14 in which is a loosely contained disk 15, of any preferred material, the extreme lower end of the stem being engaged by bands 16, or the like, to a tube 17, containing a small central perforation 18, engaged with the mouth piece 20 as indicated by means of a sleeve 21.

The operation of expanding the article is by placing the lips to the mouth-piece 20 and blowing the breath therein whereupon the disk 15 is raised from its seat on the element 17 and at the same time the elastic material or fabric of which the globe is made is caused to expand in the annular portion 14 so as to form an air passage between its inner surface and the edge of the disk 15.

Immediately when the current of air ceases, the disk 15 returns downward closing the passage 18 and preventing any emission of air from the globe. When it is desired to deflate the globe a pin or stylus, (not shown), is passed upward through the passage 18, raising the disk, and allowing the pressure to escape.

Thus it will be seen that a very simple, inexpensive device is produced, well calculated to provide entertainment and instruction or to convey information in a novel manner.

Having thus described my invention what I claim as new and desire to secure by Letters Patent, is:—

In a device of the class described, an air-tight, flexible casing capable of being expanded into a globular shape having a surface adapted to receive cartographical inscriptions, a flexible stem formed with said casing having an enlarged annulus in its neck midway in its length, an imperforate disk loosely contained therein, and a mouth piece engaged with said stem, said mouth-piece having an opening normally covered by said disk whereby air is prevented from escaping from said casing.

Signed at New York, in the county of New York and State of New York, this 27th day of March, A. D. 1916.

JEWEL LEWIS.

Witness:
FRANCIS J. NEKARDA.